Dec. 17, 1968     G. J. YEREMIAN     3,416,526
NON-ADHERENT BANDAGE PAD
Filed Dec. 6, 1966

INVENTOR.
GEORGE J. YEREMIAN
BY David B. Ehrlinger

3,416,526
NON-ADHERENT BANDAGE PAD
George J. Yeremian, Greenwood, S.C., assignor to Parke, Davis & Company, Detroit, Mich., a corporation of Michigan
Filed Dec. 6, 1966, Ser. No. 599,501
3 Claims. (Cl. 128—156)

This invention relates to surgical dressings and more particularly to a stabilized non-adherent bandage pad of an improved type.

Prior to the present invention, available dressings were in general failed to provide the intended free, non-adherent release from the healing wound surface. One conventional dressing of the type in question, while not truly non-adherent, nevertheless achieves some improvement with a construction in which the wound is contacted by a smooth perforated plastic film-gauze laminate. One such dressing is shown in U.S. Patent No. 2,923,298. More recently, a material with superior non-adherent properties has been developed. This superior material, referred to below in detail, is a bonded laminate comprising needled webs of neutral organic plastic resin fiber and cellulosic material. One face of the laminate is composed of porous resin and this serves as the non-adherent contact surface for the wound. One difficulty with this laminated material, however, is that it has a relatively low abrasion resistance. Also, it tends to delaminate when employed in certain types of dressing, particularly under stress of normal wear. A consequence of abrasion and delamination is that fibrous particles and other small particles can become dislodged from the dressing onto the wound site from which their later removal may be difficult and even distressing.

It is an object of the present invention therefore to provide an improved non-adherent surgical dressing which is stabilized against abrasion, delamination, etc.

It is also an object of the invention to provide an economical non-adherent surgical dressing which can be efficiently made in large volume.

Another object is to provide a surgical dressing which can be safely applied to the wound site and kept there for indefinite periods under widely varying conditions of use without risk of introducing extraneous debris or particles to the wound site.

Still another object is to provide an improved surgical dressing which can readily be manufactured and packaged and thereafter distributed and used under sterile conditions, all the while retaining its intended structural integrity and aesthetic usefulness.

Figure 1:
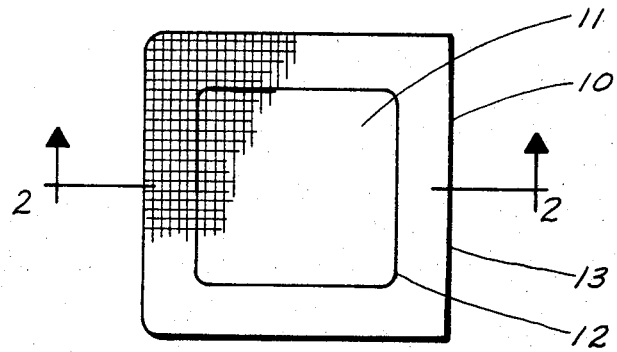
Figure 2:
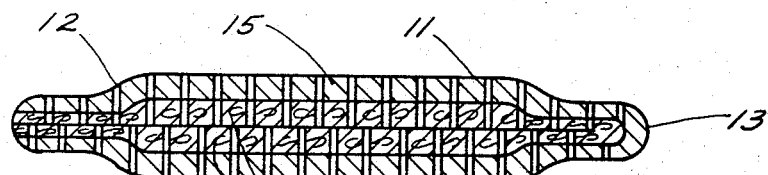

Other objects, advantages, and purposes will be seen in the following description in reference to the accompanying drawings in which:

FIG. 1 is a plan view of a non-adherent dressing pad according to the invention; FIG. 2 is a diagrammatic cross-section of the dressing of FIG. 1 taken on line 2—2; and FIG. 3 is a similar view showing the construction of the pad.

As seen in FIGS. 1 and 2 the dressing 10 of the invention comprises a laminated pad having non-adherent surfaces 11 including marginal shoulders 12. The laminate which is folded double as shown in FIG. 3 to form the edge 13 comprises a cellulosic layer 14 and a resin fiber layer 15. While the pad is preferably rectangular as shown, it can be any of a wide variety of sizes, shapes, thicknesses, etc., for application to various parts of the body, depending on particular requirements. An advantageous feature of the dressing pad of the invention is that both faces have the desired non-adherent properties so that either face or both faces can be applied to the wound site. The pad is therefore well adapted for special uses such as interdigital compresses and the like, or when rolled into tampon form, for insertion into body cavities. The cellulosic layer 14 is one having moisture absorption properties and is composed of a non-woven mat or web of natural fibers such as cotton, artificial fibers such as rayon, or mixtures of such fibers; the layer may also contain other fibers or adjuvants such as an inert thermoplastic olefinic bonding fiber, e.g., polypropylene. The resin fiber layer 15 is one permitting free flow to moisture and yet inert and compatible with the wound surface. Any of various resins or mixtures of resins which meet these requirements and which are thermoplastic, as will be hereinafter described, will be satisfactory. The polyolefins such as polyethylene, polypropylene, etc., and other similar inert resin materials are suitable. Polypropylene is preferred for its ability to withstand steam sterilization. Other absorbent layers such as cellulose wadding, open weave textile and the like can if desired be included with the cellulosic layer. The cellulosic layer and the resin fiber layer in the pad according to the invention are secured together by needling and heat fusion. In the needling operation used to produce pads of this type, the somewhat loose laminate is processed through a needling machine wherein the needles are injected through the laminate causing the ensnared resin fibers to pass through the cellulosic layer at random spaced points, and the resulting needled fibers 16 are heat fused in place. Fusion of the needled laminate is accomplished conveniently by passing the needled laminate through pressure rolls with the resin fiber layer in direct contact with the heat surface to cause the fibers to soften, merge and rearrange to a substantially flat, smooth integral porous surface with the needled fibers likewise merged into the compressed cellulosic mat. Upon cooling, immediately after leaving the pressure rolls, the resin hardens and the compressed webs are thus transformed into a single integrated laminate having the characteristics of a smooth durable dense blanket structure.

For purposes of illustration, a suitable needled, pressure-secured pad can be made using a sheet of cellulose wadding (14 lbs./ream) laid over non-woven web of rayon fibers (1⅛″ length, 3 denier). A like web of non-woven polypropylene fibers is next laid over the first web (to provide a weight ratio per unit area of 46 parts polypropylene, 21 parts wadding and 33 parts rayon) and the resulting laminate weighing about 4¾ ounces per square yard is passed through a needling machine having 9 barbs per needle to give between 100–120 needle perforations per square inch through the laminate. The laminate is then fed through heat rolls for average exposure of ½ second to 20 pounds per square inch and temperatures above 270° F. sufficient to fuse the resin and provide a smooth surface with non-adherent characteristics. The resulting laminated pad material which is an improvement over prior non-adherent materials is nevertheless unsatisfactory, as indicated above, because of delamination, low resistance to abrasion, etc.

Figure 3:
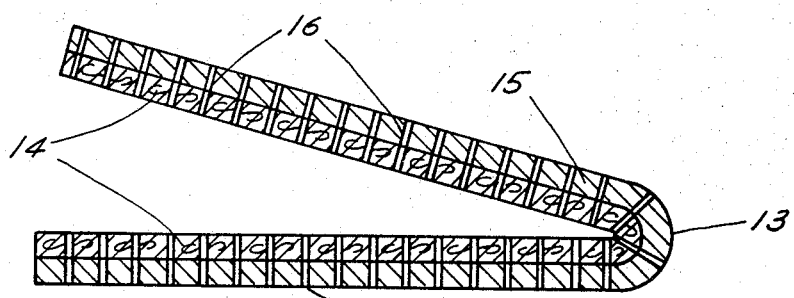

According to the present invention, however, freedom from abrasion damage, delamination and the like is advantageously obtained by folding the pad double upon itself as shown in FIG. 3 and then adhesively securing the opposed faces or at least the unfolded edges preferably by heat and pressure means. The pad is preferably formed with the marginal shoulder 12. The shoulder can be formed in the pad by any convenient forming means such as by pressing between stamping dies or passing the pad edge lengthwise through opposed embossing wheels, the surface contacting the non-adherent side in any case being preferably maintained at elevated temperature sufficient to soften the thermoplastic and thereby impress a permanent set at the edge in the form of a shoulder. Pressure and heat means applied in this way serve to anchor the resin and cellulosic fibers within the body of the pad and also to render the pad more dense and rigid. Further, loose fibers, whiskers, etc., are advantageously eliminated by this procedure, if necessary by first spraying on or otherwise applying at the interface a suitable binder such as methyl cellulose solution or an adhesive or thermoplastic sealing means responsive to heat and/or pressure. The shoulder can extend around all margins of the pad including the folded edge, if desired. In this connection while it is important for the shoulder to extend along and reinforce the unfolded edges, such a shoulder at the folded edge is not essential. A preferred construction is one in which the pad includes supplementary absorbent material in the form of a central layer or filler within the confines of the shoulder 12. This layer can advantageously include otherwise difficultly manageable but nevertheless highly efficient and economical absorbent materials such as cellulose fluff, short fibers and other similar materials. This embodiment takes advantage of the cooperative elements of the structure wherein the central contents are locked in and are therefore not subject to abrasion or other dislocating forces. The invention contemplates the provision of a protective envelope suited for sterilizing and maintaining the dressing in sterile condition for ultimate application to the wound site.

I claim:

1. A surgical dressing comprising a non-adherent laminated pad having a cellulosic layer and a porous resin fiber layer mutually secured by needling means, the pad being folded at the mid-line and doubled upon itself to confine the cellulosic layer and expose the resin fiber layer, the opposing faces of the folded pad being adhesively secured together at least at the unfolded edges of the pad.

2. A surgical dressing according to claim 1 wherein the pad has a rectangular shape and is provided with a marginal compression shoulder along at least the unfolded edges of the pad.

3. A surgical dressing according to claim 1 wherein the pad comprises a needled non-woven rayon-polypropylene fiber heat bonded laminate.

References Cited

UNITED STATES PATENTS

| | | | |
|---|---|---|---|
| 2,923,298 | 2/1960 | Dockstader et al. | 128—296 |
| 3,122,141 | 2/1964 | Crowe | 128—296 |
| 3,229,691 | 1/1966 | Crowe | 128—156 |
| 3,331,728 | 7/1967 | Lane | 161—112 |
| 3,369,547 | 2/1968 | Sack et al. | 128—296 |

ADELE M. EAGER, *Primary Examiner.*

U.S. Cl. X.R.

128—296, 268; 161—112